Feb. 16, 1971  L. E. ELFES  3,563,013
AUTOMATIC COMBINE CONTROL
Filed July 22, 1968
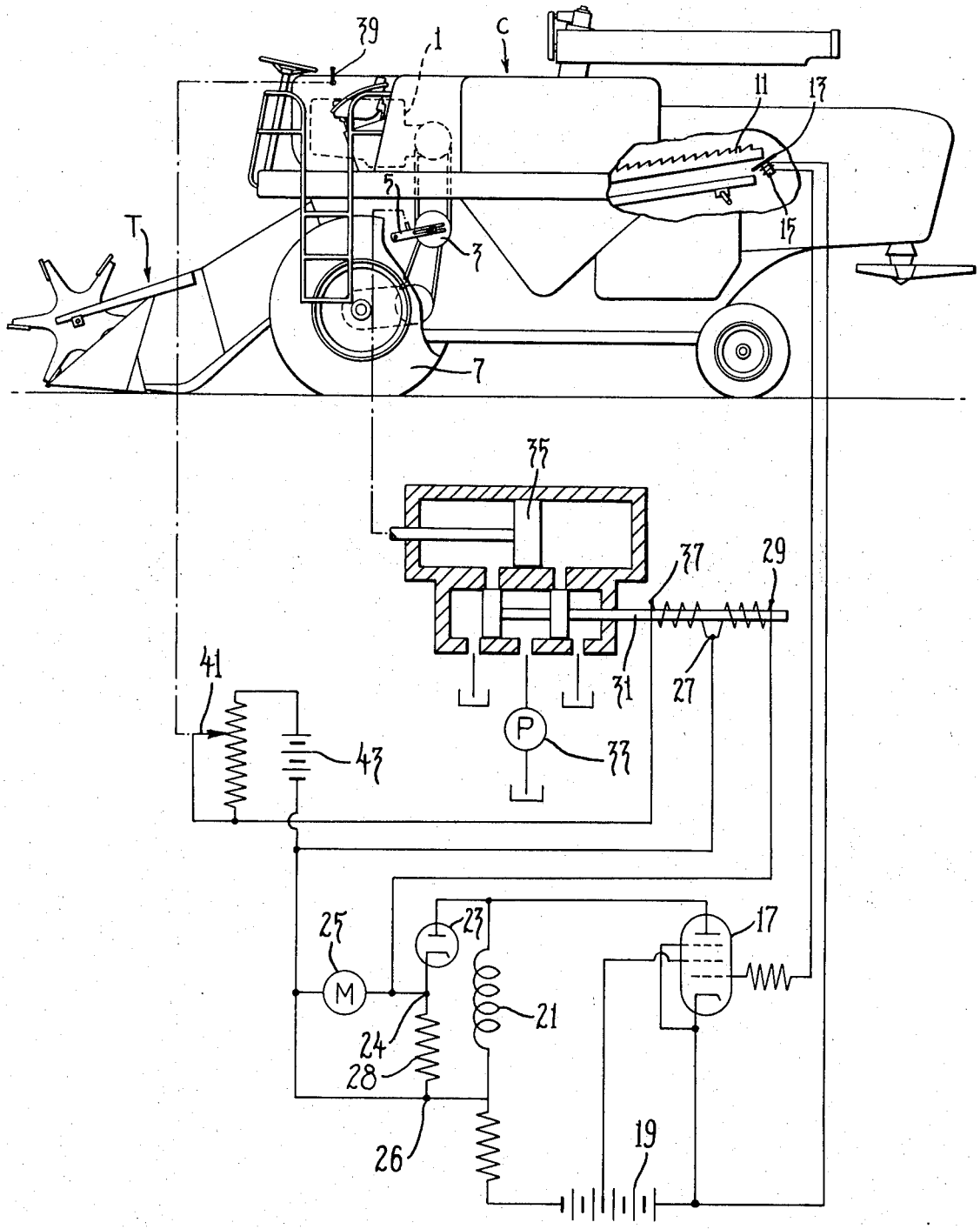
INVENTOR.
LEE E. ELFES
BY
Tweedale & Gerhardt
ATTORNEYS 3,563,013
AUTOMATIC COMBINE CONTROL
Lee E. Elfes, Bloomfield Hills, Mich., assignor to Massey-Ferguson Inc., Des Moines, Iowa, a corporation of Maryland
Filed July 22, 1968, Ser. No. 746,485
Int. Cl. A01d 41/00
U.S. Cl. 56—20                                        4 Claims

ABSTRACT OF THE DISCLOSURE

A harvesting combine with a crop separating unit and having an electromechanical transducer located in the machine at a point for measuring the relative amount of unseparated grain and thereby the efficiency of the separation unit, automatic ground speed control for the machine that is responsive to changes in the output of the transducer to change the speed of the machine to maintain the grain loss below a predetermined minimum. A manual control is provided to set the predetermined minimum and override the automatic control.

---

This invention relates to combine harvesters and more particularly to automatic control of the harvester speed to maintain a high separation efficiency in the machine.

Combine harvesters have become more and more efficient in separating grain from the total harvested crop including straw and chaff. Under different crop conditions including variable yield, moisture content, height of the crop and other factors, there is usually one ground speed for the harvester that will yield the maximum efficiency or contrary will have the least grain loss.

Grain loss can occur in the separation or the cleaning process but generally increases in loss in one process will be accompanied by increased losses in the other process. Means for measuring the amount of grain in the straw leaving the separation unit of the combine or in other parts of the threshing, separating and cleaning process have been proposed. Such means provide a ready method of determining the efficiency of the machine but are of value only if the operator adjusts the machine to an optimum speed that produces the maximum rate of harvest with a minimum of grain loss. This required constant monitoring of the loss measuring means, such as a meter, by the operator with either a sacrifice in the operator's attention to other duties while operating the machine or only a part time use of the grain loss information.

It is therefor an object of the invention to provide an automatic system for a combine harvester that will continuously and automatically change the ground speed of the machine to maintain a relatively constant grain loss percentage.

Other objects and advantages will be readily apparent from the following description and accompanying drawing which schematically shows a representative automatic control system for a combine harvester.

Briefly, the invention comprises providing one or more grain sensing transducers or sensors such as a microphone, at a point in the combine where waste products only would flow if the separating and/or cleaning function of the combine was 100% efficient, the microphone being responsive to impacts of grain kernels to produce an electrical signal having a frequency dependent on the rate of kernel impact. The microphone is connected to a frequency to voltage or current converter which provides an output signal proportional to the relative rate of kernel impact. This signal is then used to control a solenoid valve that in turn controls a hydraulically operated variable speed drive for the combine. A manually set means is provided for varying the output from the converter required to maintain a constant combine speed.

A conventional self-propelled combine C having a grain table T is illustrated. An engine 1 acts to drive the tractor through conventional power train means including a variable speed drive of any suitable type but which is shown as a variator or variable pulley drive. The variable pulley 3 is controlled by an arm 5 whose movement is controlled in a manner described below. The variable speed drive powers the combine traction wheels 7. As the arm 5 is moved the ratio of drive between the engine and wheels is varied thus changing the speed of the combine.

The grain loss sensor unit, only one of which is shown, may be of any suitable type and may be located in a variety of positions. The sensor shown is a microphone type and is located at the rear of the conventional straw walkers 11 of the combine. A plate 13 is connected to a magnet inside of an induction coil 15 which is electrically connected to the input of a frequency counter unit. As kernels of grain hit the plate 13 the same is caused to vibrate and cause a current to be induced in the coil 15 in the manner of sound hitting a microphone.

The frequency counter may be of any suitable type which produces an output voltage or current that is proportional to the number of pulses or frequency of an input signal. An example of such a frequency counter is illustrated and described in U.S. Pat. No. 2,416,078, entitled, "Frequency Counter." The details of the counter or converter form no part of the invention and the particular apparatus shown is only illustrative.

A pentode amplifier 17 has its grid connected through a resistance. The plate circuit includes an inductance 21 and a diode 23. A battery 19 or other source of voltage provides the plate voltage and a top therefrom provides a screen grid voltage. A diode resistor 28 provides a load across which the counter output is taken at points 24 and 26. A meter 25 provides a visible indication of the voltage across the diode resistor.

The operation of the circuit is fully described in Pat. 2,416,078 and it is sufficient to state that the voltage between points 24 and 26 is proportional to the frequency of pulses applied to the input of the amplifier tube 17 and hence proportional to the rate that kernels impinge at the plate 11. Straw hitting the plate has no effect thereon.

The output of the counter unit is also connected to terminals 27 and 29 of a solenoid operative to move a conventional control valve 31. A counter voltage on the solenoid is provided at terminals 27 and 37. This voltage is provided by any suitable means and is shown provided by a voltage divided circuit including a manually operated lever 39 that moves tap 41 on a potentiometer across a battery 43. As the tap 41 is moved by lever 39 the voltage across contacts 27 and 37 increases and decreases to change the voltage required between contacts 27 and 29 required to maintain the valve 31 in a neutral position.

Movement of the valve 31 to the right will cause oil from a pump 33 to be applied to one side of a piston 35 and a relief port to be connected to the other side of the piston. The piston 35 is connected to the arm 5 in a manner such that when the signal from coil 15 increases in frequency, the output between 24 and 26 increases causing the valve 31 to move and actuate piston 35 and move the variable speed drive control arm 5 to a slower speed position.

Contrariwise, if the rate of kernels hitting the plate 11 should decrease the system operates to increase the ground speed.

As the ground speed of the combine increases or decreases the efficiency of the separating unit changes and the amount of grain hitting the plate 11 will decrease or increase respectively. When the signal from the counter unit balances the voltage set by the lever 39, the valve 31 will be centered and the drive ratio will remain constant. If the crop condition changes as the machine proceeds down the field, an increase or decrease of kernels hitting the plate 11 will cause a change in ground speed until the original rate of grain loss is obtained.

It will be obvious that the meter 25 can be calibrated to indicate bushels per acre, etc., and that the lever 39 can be adjusted as the machine is operated until the meter 25 indicates the desired grain loss rate. Once set the system then operates automatically.

It will be understood that other forms of sensors, amplifiers, frequency counters and speed controls could be used and that the sensors may be located in a number of different positions. The invention is deemed to include these other forms and arrangements and is limited only by the following claims.

What is claimed is:

1. A combine harvester machine including processing means for separating grain from a harvested crop, means for controlling the speed of the machine, grain sensor means located in the machine at a point for measuring the relative amount of grain lost during the processing and not separated, means responsive to changes in the relative amount of grain lost as measured by said sensor means and connected to the speed controlling means to vary the speed of the machine to maintain the relative grain loss below a predetermined minimum value.

2. The machine of claim 1 wherein means are provided for setting said predetermined minimum value.

3. The machine of claim 1 wherein said sensor comprises an electromechanical transducer having a surface located at a point in the machine in the path of material flow adjacent to the end of the separating operation and adapted to be struck by unseparated grain and caused to vibrate thereby, electrical signal producing means connected to the surface providing an AC voltage having a frequency proportional to the surface vibration, converter means connected to said AC voltage for producing an output signal having a voltage or current proportional to the frequency of the AC voltage.

4. The machine of claim 3 wherein said speed controlling means constitutes a hydraulically controlled variable speed drive including electrically operated valve means, said valve means controlled by said output signal to change the speed of the machine in accordance with changes on the frequency of impacts of grain on said surface.

References Cited

UNITED STATES PATENTS

| | | | |
|---|---|---|---|
| 2,887,226 | 5/1959 | Angus | 209—139 |
| 3,442,068 | 5/1969 | Bulin | 56—20 |
| 3,368,214 | 2/1968 | Swanson | 56—21X |

FOREIGN PATENTS

| | | | |
|---|---|---|---|
| 234,307 | 6/1961 | Australia | 130—27.11 |
| 53,446 | 1/1967 | Germany | 130—24 |

ANTONIO F. GUIDA, Primary Examiner

U.S. Cl. X.R.

130—24; 340—271